United States Patent [19]
Duwell et al.

[11] 4,265,584
[45] May 5, 1981

[54] SYSTEM FOR OPENING AND EMPTYING CONTAINERS

[75] Inventors: Michael J. Duwell, Chicago; Paul B. Specht, Wilmette, both of Ill.

[73] Assignee: Heartland Chemicals, Farmer City, Ill.

[21] Appl. No.: 29,782

[22] Filed: Apr. 13, 1979

[51] Int. Cl.³ .......................................... B65G 65/40
[52] U.S. Cl. .................................................. 414/412
[58] Field of Search ............... 414/412; 141/238, 114; 222/325, 326, 327, 83.5, 86, 89, 608–628, 81, 83, 85, 88; 111/85; 221/197

[56] References Cited

U.S. PATENT DOCUMENTS

| 2,848,144 | 8/1958 | Haskell et al. | 141/238 X |
| 3,216,620 | 11/1965 | Laughlin | 222/623 X |
| 3,482,718 | 12/1969 | Moriarty | 414/412 |
| 3,596,842 | 8/1971 | Barber | 414/412 X |
| 3,606,057 | 9/1971 | June | 414/412 |
| 3,724,721 | 4/1973 | Barr | 222/83.5 |
| 3,856,211 | 12/1974 | Williams | 222/624 |

FOREIGN PATENT DOCUMENTS 482050 3/1938 United Kingdom ...................... 222/81

Primary Examiner—Allen N. Knowles
Attorney, Agent, or Firm—Edmond T. Patnaude

[57] ABSTRACT

A system for distributing granular material to the soil incorporates an enclosure for holding a container while a piercing and flap opening blade assembly is rotated through the wall of the container to tear open a flap at the bottom.

13 Claims, 13 Drawing Figures

SYSTEM FOR OPENING AND EMPTYING CONTAINERS

The present invention relates in its broader aspects to a method and apparatus for opening and emptying containers such as plastic and paper composition sacks or bags containing, for example, particulate materials, and it relates more particularly to such methods and apparatus wherein the container is totally enclosed during the opening and emptying operations to prevent dust and the like from escaping to the atmosphere.

BACKGROUND OF THE INVENTION

Toxic materials for controlling insects, weeds, and fungi are commonly used in the agricultural industry and are a source of constant danger to farm personnel and livestock. These materials are generally used in powder or granular form and are packaged in plastic or paper composition bags each weighing from about twenty-five pounds to one-hundred pounds. At the present time, these bags are simply opened by the farmer and the contents are then poured into hoppers from which the toxic material is distributed to the areas where needed.

As an example of the danger associated with many of these toxic materials, consider the typical procedure now used in the United States for controlling corn rootworm. Perhaps the only effective insecticide which may legally be used in the United States for controlling corn rootworm is an organic phosphate which degrades after a few months in the soil or in a living body. However, while these organic phosphates have the desirable characteristic of being biodegradable they are extremely toxic cholinesterase inhibitors which cause severe symptoms and sometimes death when inhaled, ingested or absorbed through the skin. These insecticides are usually applied to the soil when the corn is being planted, and this is accomplished by means of insecticide distributors mounted to the planter which is in turn pulled by a tractor.

Recommended procedures for handling these insecticides include the use of masks, respirators, gloves, disposable clothing and the like while the bags are being unloaded into the hoppers mounted on the planters. However, such procedures are often not used. Moreover, it is recommended by the Environmental Protection Agency that the emptied bags be transported to an approved incinerator or landfill site for disposal, but because these sites are not always near at hand and thus are inconvenient to a busy farmer at planting time, the usual practice is simply to burn the empty bags either during or following planting. Toxic residue remaining in the bags can be released into the air as the bags are burned in an open fire.

It would be desirable to provide a means for enclosing each bag while it is being opened and emptied so as to minimize if not entirely eliminate the release of toxic dust to the atmosphere. In order to be effective, it is necessary that each bag be substantially completely emptied, and perhaps more importantly, the procedure must be fast. Otherwise, the busy farmer will probably use the present system of simply opening the bags and then pouring the contents into the hoppers.

SUMMARY OF THE INVENTION

Briefly, in accordance with the teachings of the present invention new and improved apparatus is provided for opening and emptying bags containing granular material while the bags are completely enclosed and sealed from the atmosphere. A novel blade configuration as described in detail hereinafter is rotatably mounted near the bottom of the device for piercing a lower corner portion of a bag, for forming and tearing open a flap so that the opening remains in a fully expanded condition as the contents flow from the bag, and the flap remains intact with the bag so as not to jam the distributing system.

In accordance with a further aspect of the invention, one or more of the bag opening and emptying devices are adapted to be mounted directly on a planter or the like, and each such device respectively feeds one or more insecticide distributors carried by the planter. In some cases as described in greater detail hereinafter, each such device may supply one or more closed hoppers which in turn supply one or more of the distributors which deposit precise amounts of the insecticide into the soil. Accordingly, a completely closed system is provided which substantially reduces the possibility of the insecticide being inadvertently released to the atmosphere or otherwise contacting the persons handling it and which protects the insecticide from the elements.

BRIEF DESCRIPTION OF THE DRAWINGS

The present invention will be better understood by a reading of the following detailed description taken in connection with the accompanying drawings wherein.

DETAILED DESCRIPTION OF THE INVENTION

The preferred embodiments of the invention which are described hereinafter were designed for use with the types of paper, metal and plastic composition bags which have been conventionally used for packaging insecticides in particulate form. It will be apparent, however, that the invention is not limited in use to bag type containers but may be used with boxes, metal cans or many other types of containers which must be opened and emptied prior to use.

Figure 1:
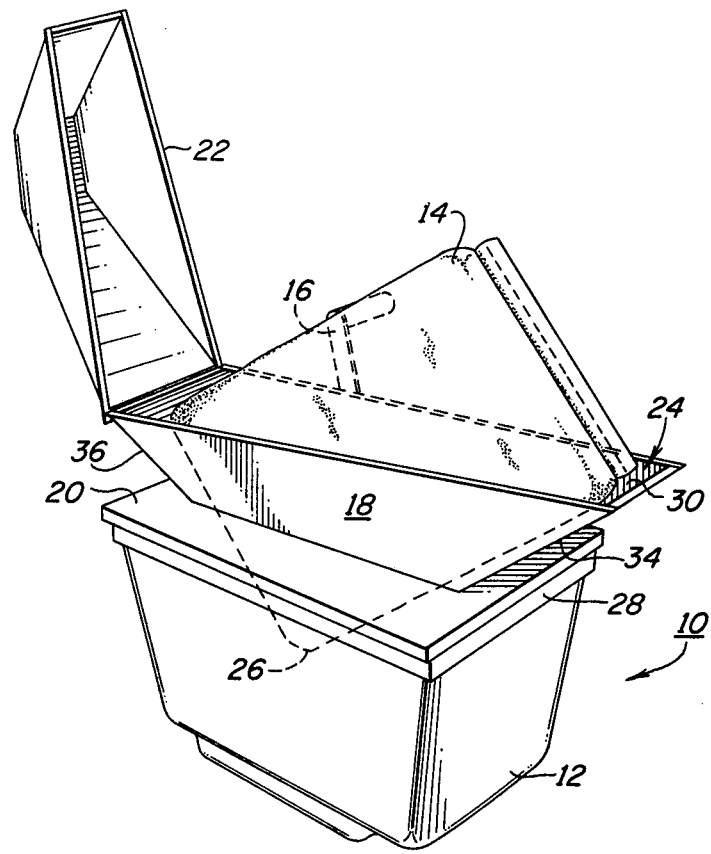
FIG. 1 is a perspective view of a container opening and emptying device embodying the present invention, the cover being shown in an open position and a container being located within the device.
Figure 2:
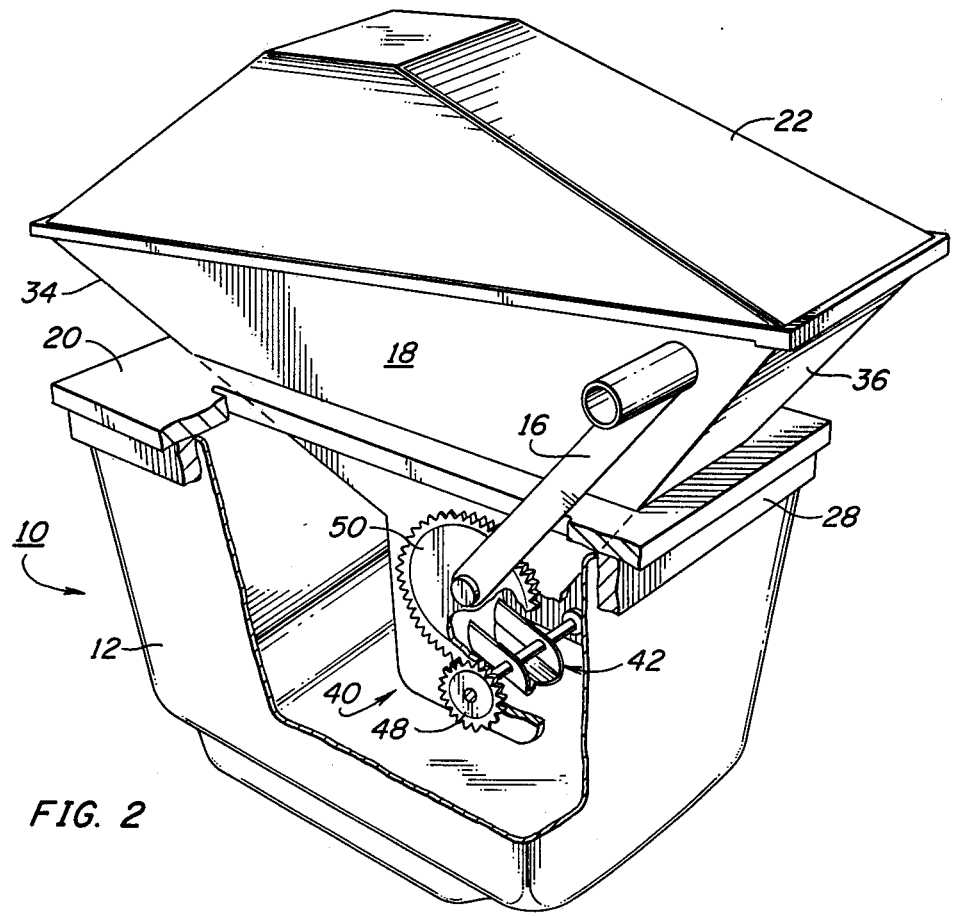
FIG. 2 is another perspective view of the device of FIG. 1, a portion thereof being broken away to show the internal container opening mechanism.

Referring to FIGS. 1 and 2, there is shown a container opening and emptying system 10 including a lower housing in the form of a hopper 12 into which the contents of a container 14 is discharged when an operating arm 16 is pulled from front to back as shown in FIG. 2. An upper housing assembly 18 has a base portion 20 which rests on the rim of the hopper 12 and a cover 22 hingedly connected thereto which fits over a container receiving opening 24. In use, the container 14 to be opened is dropped into the opening 24 and as described more fully hereinafter comes to rest at an angle with one corner edge 26 in the lowermost position. The cover 22 is then swung into the closed position over the container and the operating arm is pulled back toward the operator to tear a flap from the bag in proximity to the corner edge 26 and to permit the contents of the container to discharge into the chamber within the hopper. It may be seen that the system is closed during opening and emptying of the container 14 and thereby prevents any of the contents from entering the atmosphere.

Those skilled in the art will recognize that the hopper 12 may be part of a conventional insecticide spreader attached to a planter for towing by a tractor. However, the bag opening mechanism may be mounted on a central hopper which in turn supplies insecticide or other material to a plurality of other hoppers which are individually parts of separate spreader devices. This latter type system is described hereinafter in connection with FIG. 11.

Considered in greater detail, the base 20 of the upper housing assembly 18 has a depending continuous flange 28 which extends downwardly along the outer edge of the rim of the hopper 12 to position the housing assembly 18 on the hopper 12 and also to prevent dust and the like from contaminating the atmosphere. If desired, a resilient sealing gasket may be carried on the bottom surface of the base member 20 for sealing engagement with the rim of the hopper 12.

Figure 4:
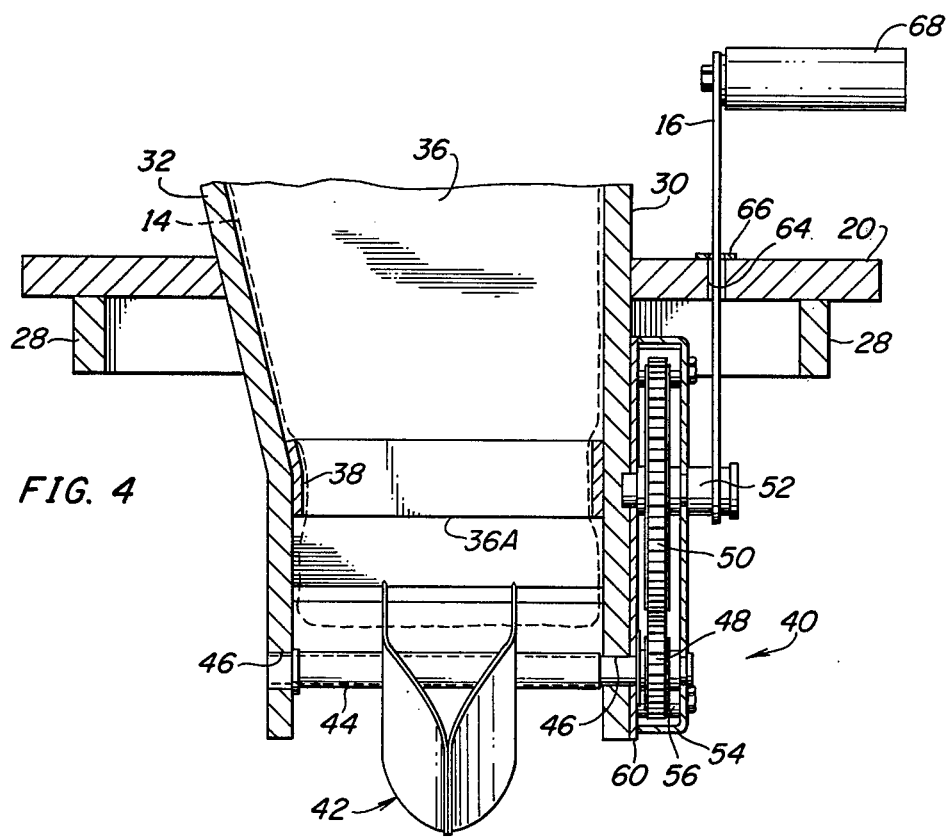
FIG. 4 is an elevational view of the bag opening mechanism as seen from the left of FIG. 3.
Figure 8:
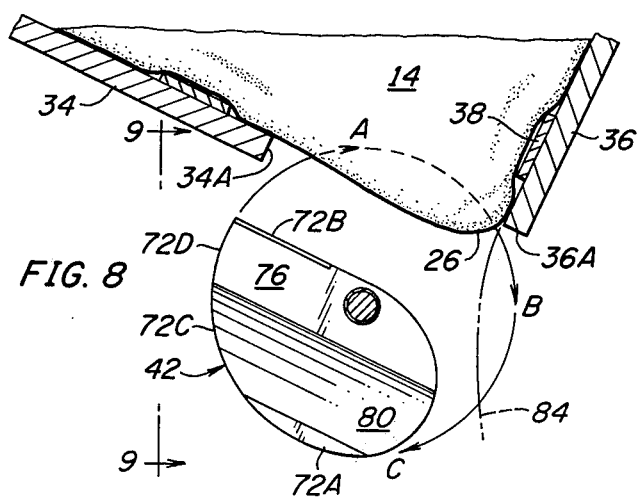
FIG. 8 is a side view showing a container in position for opening in the device.

The container enclosing portion of the upper housing assembly 18 includes a vertical side wall 30, see FIG. 4, and an opposite side wall 32 which slopes inwardly toward the bottom where the bag opening mechanism is located. The assembly 18 further includes flat end walls 34 and 36 which also slope inwardly toward the bottom and lie in respectively orthogonal planes. The lower edges 34A and 36A of the walls 34 and 36 in conjunction with the adjacent sides of the walls 30 and 32 define a rectangular opening. As shown in FIG. 8, when a container 14 is placed in the housing 18 the lowermost corner 26 depends into this rectangular opening. If desired, a continuous resilient sealing gasket 38 may be secured to the walls 30, 32, 34 and 36 just above this opening to sealably engage the container throughout a continuous annular area to prevent dust and the like from floating around the outside surfaces of the container when the contents are being discharged.

Although the present invention will find application with containers of many different types, shapes and sizes the illustrated embodiment of the invention was designed for use with composition paper sacks or bags of the type commonly used for packaging granular materials such as insecticides, herbicides, fertilizer, salt and cement. Accordingly the container 14 is shown to be such a bag and, therefore, is generally rectangular in cross-section when lying flat during normal storage in a filled condition. Such bags do not, however, retain any given shape when picked up or placed in a standing position. When such a bag is thus placed in the upper housing 18 the contents move toward the lowermost position in the bag causing the bag to swell at the bottom into intimate contact with the walls 30, 32, 34 and 36. Moreover, the sloping surface of the wall 32 assures that the lower end corner of the bag falls into the bottom opening. Preferably the inner surfaces of the walls 30, 32, 34 and 36 are smooth and relatively slippery to prevent the bag 14 from hanging up in the housing with the lowermost portion thereof above the bottom opening.

It should be understood that the container 14 may be constructed to retain a predetermined shape. A box in the form of a hexahedron is one example of such a container. On the other hand, the container 14 may be simply a bag formed of woven cloth which retains no particular shape while being handled.

Figure 3:
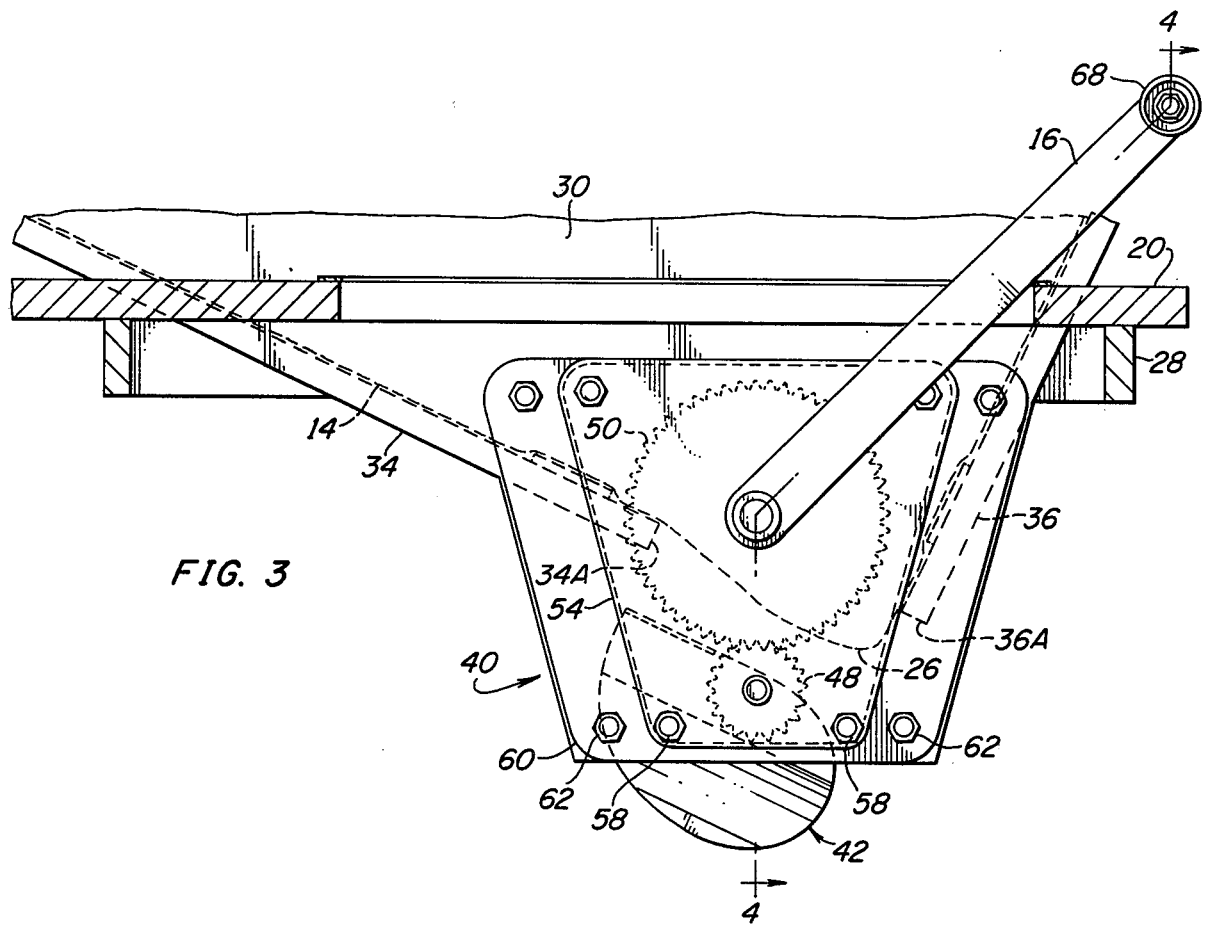
FIG. 3 is an elevational view of the bag opening mechanism as seen from the right side of the device as shown in FIG. 2.

With particular reference to FIGS. 2, 3 and 4, it will be seen that the container opening mechanism which is generally identified by the reference character 40 is mounted to the portions of the walls 30 and 32 which extend below the bottom edges 34A and 36A of the front and rear walls 34 and 36. As shown, a blade assembly 42 is fixedly mounted on a horizontal shaft 44 which is suitably journaled for rotation in aligned holes 46 and 48 in the side walls 30 and 32.

In order to rotate the blade assembly 42 to open a container positioned in the housing 18, a spur gear 48 is keyed to the shaft 44 and mates with a spur gear 50 keyed on a shaft 52. The shaft 52 is journaled at its inner end in the wall member 30 and in a shroud plate 54. The shroud plate 54 is positioned against a plurality of spacers 56 and held in place by machine screws 58. Preferably the gear assembly is a subassembly and thus includes a mounting plate 60 which is attached to the wall member 30 by a plurality of bolts 62.

The shaft 52 extends through a hole in the shroud plate 54 and the operating arm 16 is attached thereto. The arm 16 extends through a slot 64 in the base member 20 and through a slotted plate 66 mounted to the base member 20 over the slot 64. A handle 68 extends from the arm 16 to facilitate operation thereof. As thus far described, it may be seen with reference to FIG. 3 that as the arm 16 is pulled to the left from the position shown the blade assembly 42 rotates in a clockwise direction.

Figure 5:
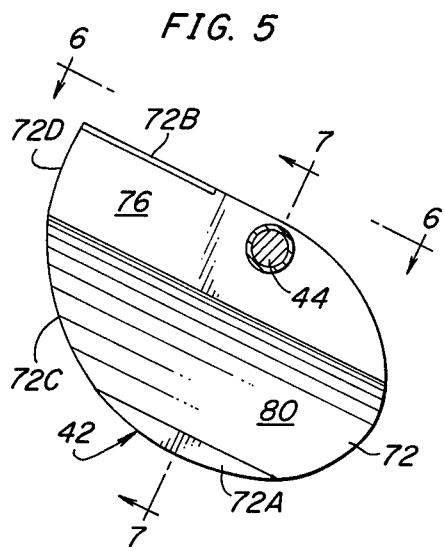
FIG. 5 is an elevational view of the blade assembly of the bag opening mechanism as seen in FIG. 3.
Figure 6:
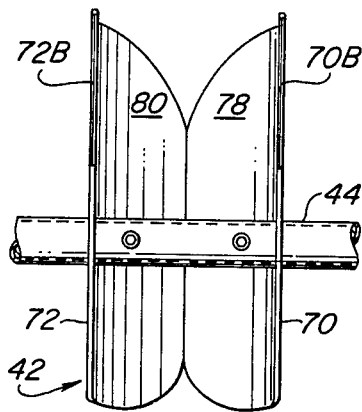
FIG. 6 is a view of the blade assembly taken along the line 6—6 in FIG. 5.
Figure 7:
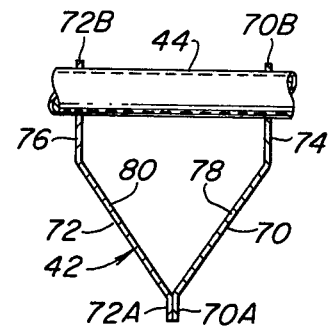
FIG. 7 is a sectional view taken along the line 7—7 in FIG. 5.

The blade assembly 42 is best shown in FIGS. 5, 6 and 7 and includes a pair of blade members 70 and 72 respectively affixed to the shaft 44 and having mutually abutting areas 70A and 72A secured together as, for example, by welding. The blades have respective piercing edges 70B and 72B which are linear and arcuate tearing edges 70C and 72C. The blades also include intermediate arcuate edge portions 70D and 72D which along with the piercing edges 70B and 72B are on the mutually parallel planar portions 74 and 76 of the blades. The arcuate tearing edges 70C and 72C are on planar portions 78 and 80 which converge together to the areas of juxtaposition 70A and 72A. As shown, the piercing edges 70B and 72B may be provided by steel knife edges affixed to the blades 70 and 72.

Figure 9A:
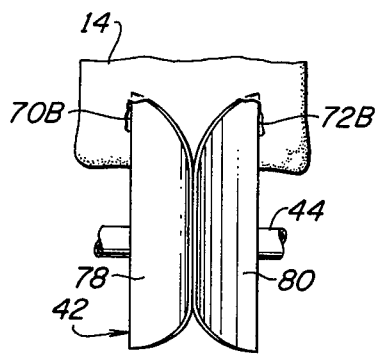
FIGS. 9A, 9B and 9C show a sequence of blade assembly positions during the opening of a container.
Figure 9B:
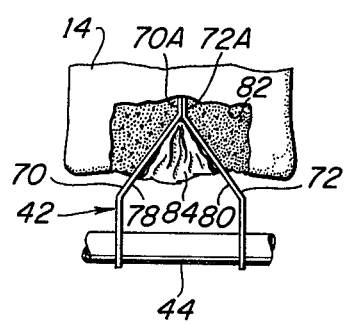

In order to facilitate an understanding of the manner in which the rotary blade means 42 functions to open a container 14, reference is now made to FIGS. 8, 9A, 9B and 9C. With the operating arm 16 in the forwardmost position the blade assembly 42 is in the position shown in FIG. 8. After a container has been placed in the upper housing and extends into the opening between the housing walls 34 and 36, the arm 16 is operated as described above to rotate the blade assembly in a clockwise direction causing the periphery of the blades to follow the circular paths A, B and C. When the distal ends of the piercing edges 70B and 72B move against the container they respectively pierce the wall as shown in FIG. 9A, and continued rotation of the blade assembly causes these two edges to make parallel slits through the lowermost portion of the container. As the piercing and cutting edges 70B and 72B move through the container the convergent tearing edges 70C and 72C follow closely behind and cause the container wall to tear along the edge 82 as shown in FIG. 9B. This tearing begins at the slits cut by the two edges 70B and 72B and moves toward the center to form a flap 84.

Figure 9C:
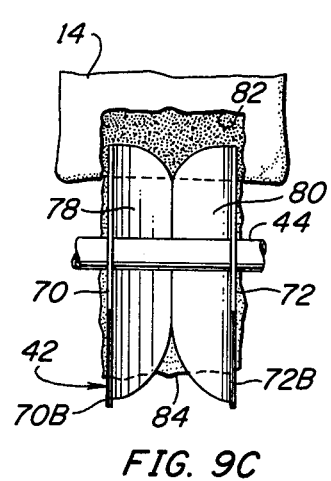

As a blate rotation continues, the flap 84 which forms between the parallel slits and the tear line 82 is gathered between the convergent blade surfaces 78 and 80 and is pulled out of the container so that it hangs down as shown in phantom in FIG. 8 and in full lines in FIG. 9C. The contents of the container is then free to pour out through the opening left by the flap which, however, remains attached to the container for later removal with the empty container. The operating arm 16 may be left in the fully retracted position while the container is emptied because the blade assembly does not interfere with the discharge from the container. However, in order to prevent the inadvertent loading of a filled container while the operating arm is in the retracted position and could not be operated to open the container, the preferred practice is to immediately return the arm 16 to the initial position. If desired, a spring return can be incorporated in the drive assembly to immediately return the arm and blade assembly to the initial position when the arm 16 is released.

Figure 10:
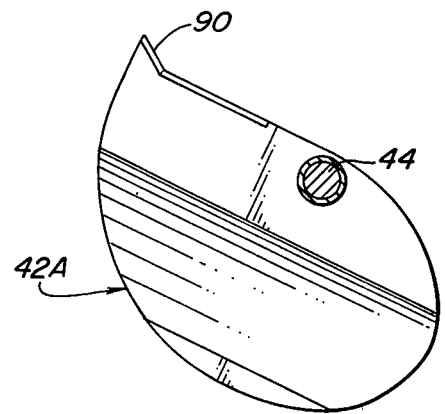
FIG. 10 is a view similar to that of FIG. 6 but showing an alternative blade design.

For use with paper composition sacks of the type presently used for packaging granular insecticides, elongated rectilinear piercing and cutting edges 70B and 72B have been found to function satisfactorily. Where the containers are, however, formed from particularly tough or hard materials, such, for example, as metal, it would be desirable to provide pointed piercing surfaces at the outer ends of the edges 70B and 72B. One such piercing and cutting edge is provided on the blade design 42A shown in FIG. 10. The blade 42A is identical to the blade 72 except for the sharply tapered piercing edge 90 which makes the initial penetration into the wall of the container. The remainder of the cutting edge is the same and like the edge 72B cuts a slit through the container wall as the blade assembly rotates through the lower corner portion of the container.

The container opening and emptying apparatus as described above is usable with many different sizes and types of containers inasmuch as only the lowermost corner is pierced and torn open. For example, sacks having pinched overlap or other end construction can be opened and sacks of different sizes can be handled by the same device.

As may thus be seen, the container opening apparatus of the present invention is carried by a base member 20 and may be mounted over any suitable container. As illustrated, the base member 20 is rectangular so as to fit onto the rectangularly shaped rim of a conventional insecticide hopper. It will be apparent, however, that this shape is not critical and the base may be shaped to fit over any desired opening which may, for example, be circular. Moreover, in order to enable the use of a standard device with many different hopper and distribution systems, adapters may be provided for sealing the standard device to these various other systems.

Figure 11:
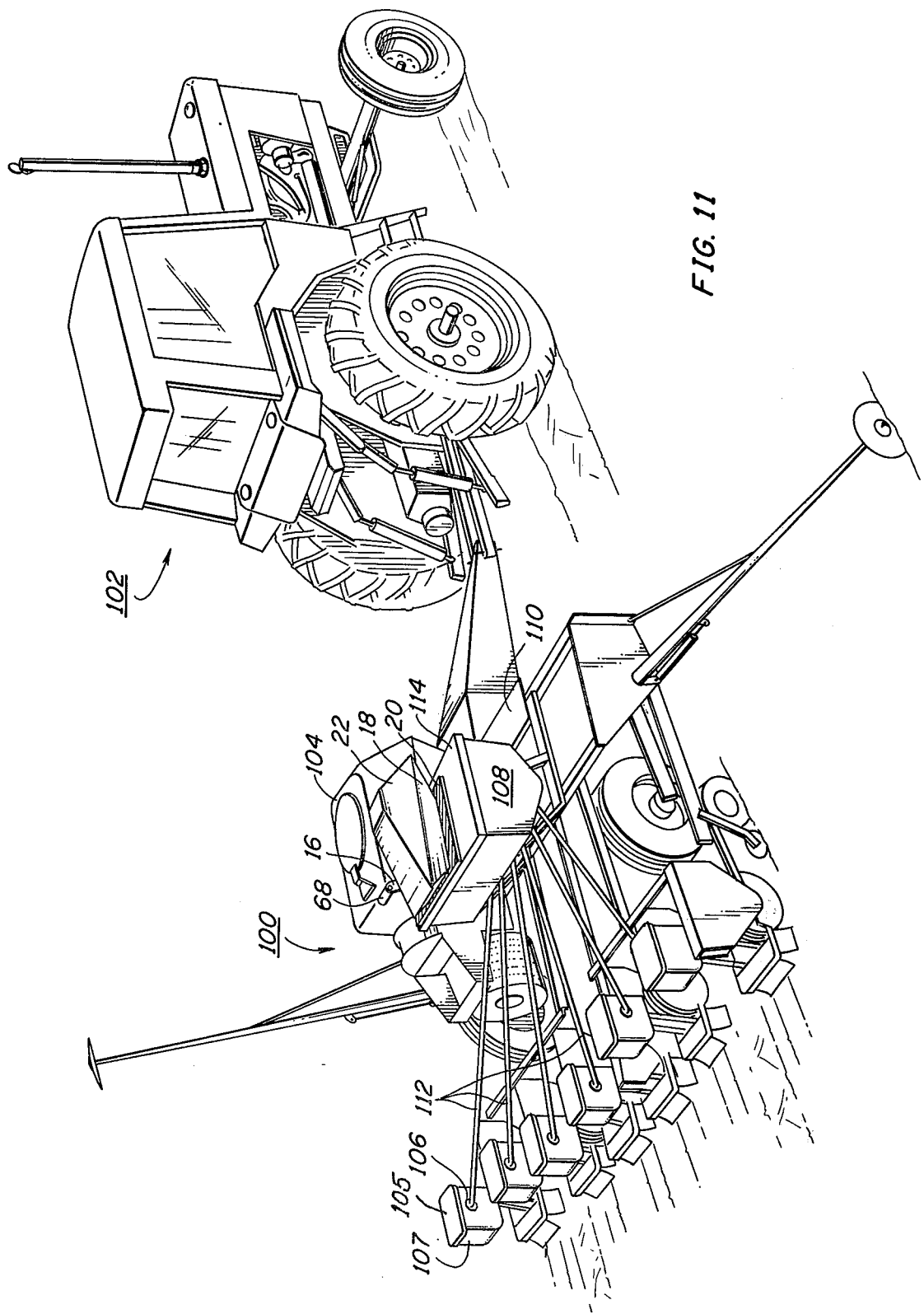
FIG. 11 is a perspective view showing another embodiment of the invention.

Referring to FIG. 11, there is illustrated another insecticide distribution system embodying the present invention and wherein a single bag opening and emptying apparatus is used to supply insecticide to a plurality of individual hoppers mounted at the rear of a conventional planter. As there shown, a conventional planter 100 is coupled to a conventional tractor 102 for planting seeds contained in a hopper 104 mounted in an elevated position at the approximate center of the planter 100.

A plurality of insecticide distributing units are attached together and to the rear of the planter and these units each include a hopper 107 having a removable cover 105. As the planter is towed through a plowed field by the tractor 102, seed is planted and granular insecticide is placed in the soil in proximity to the seed. In the past, each of the hoppers 107 was initially filled with the insecticide prior to planting by opening the insecticide containers and pouring all or some of the contents into the hoppers. If desired, each of the covers 105 may be replaced by a separate container opening and emptying device as heretofore described. However, the cost and weight of each such device may make this practice prohibitive for some farming operations.

In accordance with an important feature of the present invention, a relatively large hopper 108 having sloping bottom walls is mounted on the planter at an elevated position along side the seed hopper 104 just rearwardly of a platform 110. A plurality of conduits 112 extend from the bottom of the hopper to respective ones of the hoppers 107 and open into these hoppers through the side walls 106 thereof. A cover 114 fits over the top of the hopper 108 and a container opening and emptying device of the type described above is mounted on the cover over an opening (not shown) therein.

In use, prior to planting several containers of insecticide may be sequentially opened and emptied into the hopper 108 in the manner described above. The insecticide will flow from the hopper 108 to the hoppers 107 until the hoppers are respectively filled to the level at which the conduits 112 open therein. Inasmuch as a large flap is torn from each container when the handle 68 is pulled back toward the operator, the contents quickly and completely discharges from each bag. Consequently, the time required to use the system of the present invention is less than would be required for the farmer to manually open and unload each sack in the previous manner, and use of the system is encouraged.

While the bag is being opened and emptied, the entire system is closed and none of the insecticide is released to the atmosphere nor does any of the insecticide contact the person filling the hopper as is common with the presently used procedures.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for use in opening and emptying a container holding a flowable material, comprising
   a housing, support means for supporting said container in a predetermined position in said housing, and piercing and cutting means rotatably mounted to said housing for rotation between a first position displaced from a container supported in said predetermined position and a second position, said piercing and cutting means being configured so as to pierce the wall of said container at two spaced locations and to cut two slots therein as said piercing means is rotated from said first to said second position.

2. Apparatus according to claim 1 wherein said piercing and cutting means comprises first and second mutually spaced blade means for cutting parallel slots in said container.

3. Apparatus according to claim 1 wherein said piercing and cutting means is positioned in said housing to pierce and to cut the bottom wall of said container, and said housing is provided with an outlet disposed below said piercing and cutting means.

4. Apparatus for use in opening and emptying a container holding a flowable material comprising a housing, support means for supporting said container in a predetermined position in said housing, piercing means rotatably mounted to said housing for rotation between a first position displaced from a container supported in said predetermined position and a second position, said piercing means having first and second mutually spaced blade portions each having a container piercing edge to pierce the wall of said container as said piercing means is rotated from said first to said second position, and said piercing means having additional edge surfaces which converge toward one another so that continued rotation of said piercing means after said piercing edges have pierced said container moves said converging edge surfaces through the wall of said container to tear open a flap from the wall of said container between the two locations pierced by said piercing edges.

5. Apparatus according to claim 4 wherein
said edge surfaces are arcuate.

6. Apparatus according to claim 4, further comprising
a hopper having an opening at the top, and
cover means mounted to said housing and resting on said hopper over said opening.

7. Apparatus according to claim 6 wherein
the lower portion of said housing depends into said hopper.

8. Apparatus according to claim 6, comprising
a gear train drivingly connected to said piercing means, and
an operating arm means connected to said gear train for rotating said piercing means between said first and second positions, said cover being provided with a slot through which said arm means extends.

9. Apparatus according to claim 4 comprising
a cover hingedly mounted to said housing over an opening therein for swinging movement between an open position and a closed position wherein said cover seals said opening from the atmosphere.

10. Apparatus according to claim 6 comprising
a plurality of hoppers mounted below said first mentioned hopper, and
a plurality of ducts connecting the bottom of said first mentioned hopper to openings in said plurality of hoppers.

11. Apparatus according to claim 10 comprising
a planter for planting seed in the soil,
a plurality of pesticide distribution means connected to said planter,
said plurality of hoppers being respectively mounted to said distribution means, and
said first mentioned hopper being mounted at an elevated position on said planter.

12. Apparatus for use in distributing a particulate material to the soil, said particulate material being packaged in one or more containers, comprising in combination
planter means for planting seed in the soil,
a plurality of distributing means mounted to said planter means for distributing said particulate material while said planter means is planting said seed,
a plurality of closed hopper means mounted above and in proximity to said distributing means for supplying particulate material to said distributing means,
a main hopper mounted to said planter at an elevated position relative to said closed hopper means,
ducting connecting said main hopper to said plurality of closed hopper means, and
means mounted over an opening in the top of said main hopper for enclosing one of said containers and for opening and emptying said one of said containers into said main hopper while sealing said container from the atmosphere.

13. Apparatus for use in distributing a particulate material to the soil, said particulate material being packaged in one or more containers, comprising in combination
planter means for planting seed in the soil,
a plurality of distributing means mounted to said planter means for distributing said particulate material while said planter means is planting said seed,
a plurality of closed hopper means mounted above and in proximity to said distributing means for supplying particulate material to said distributing means and
a plurality of means mounted over respective openings in the tops of said hopper means for enclosing said containers and for opening and emptying said containers into said hopper means while sealing said containers from the atmosphere.

* * * * *